UNITED STATES PATENT OFFICE.

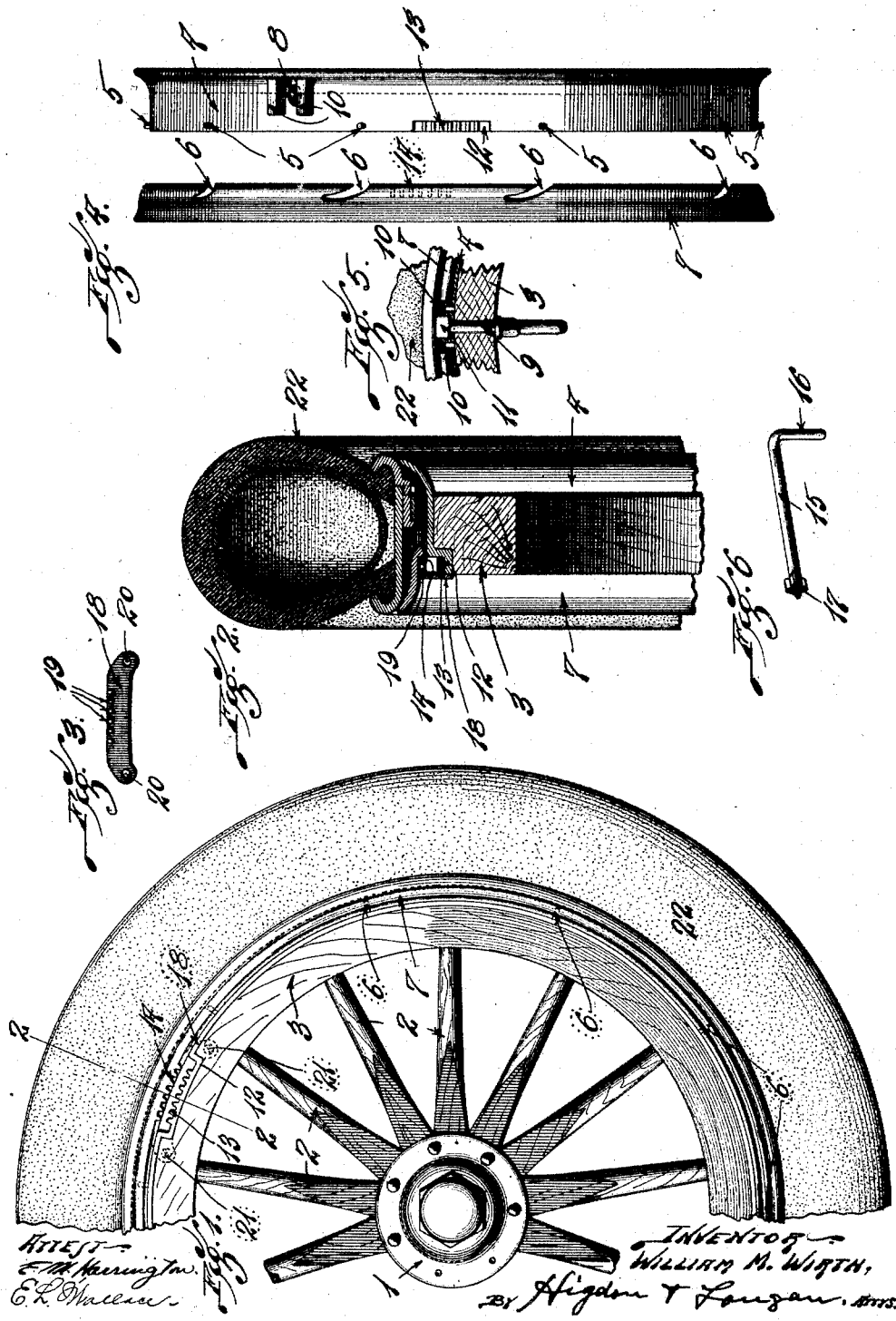

WILLIAM M. WIRTH, OF ST. LOUIS, MISSOURI.

SEPARABLE RIM FOR AUTOMOBILE-WHEELS.

1,076,730.

Specification of Letters Patent. Patented Oct. 28, 1913.

Application filed August 19, 1912. Serial No. 715,830.

*To all whom it may concern:*

Be it known that I, WILLIAM M. WIRTH, a citizen of the United States, and resident of St. Louis, Missouri, have invented certain new and useful Improvements in Separable Rims for Automobile-Wheels, of which the following is a specification containing a full, clear, and exact description, reference being had to the accompanying drawings, forming a part thereof.

My invention relates to an improved separable rim for automobile wheels, and consists in the novel construction hereinafter described and particularly designated in the appended claim.

The object of my invention is to provide an improved separable rim for automobile wheels, whereby the operation of applying and detaching a tire may be performed in the least possible time.

A further object is to provide an improved separable rim for automobile wheels, which will be very strong, efficient and durable.

In the drawings: Figure 1 is a side elevation of an automobile wheel and tire having my invention applied thereto; Fig. 2 is a sectional end elevation, the section being taken on the line 2—2 of Fig. 1; Fig. 3 is a detailed view of a toothed locking plate made use of in carrying out my invention; Fig. 4 is an edge elevation of my improved separable rim with the sections separated; Fig. 5 is a detailed sectional view of a portion of the wheel felly of the separable rim, illustrating my improved means for preventing "creeping" of the rim; and Fig. 6 is a perspective view of a pinion wrench used in attaching and detaching the detachable section of the detachable base rim.

My invention provides two important parts, viz., a separable base rim, the quick-detachable section of which is connected to the fixed section by what I term "interrupted screw threads" or inclined slots, the walls of which are engaged by lugs or pins.

Both the base rim and the outer rim may be used together, as herein shown, or they may be used separately, as will be obvious to workmen skilled in the art, the numerals 1, 2 and 3 indicating respectively the hub, spokes and felly of a common automobile wheel, on which is fixed in the usual way a fixed section 4 of the base rim. This section 4 is in the form of a ring, and is provided upon its periphery at its inner marginal edge with a symmetrical series of radial lugs, pins or other projections 5, which extend outwardly a short distance from the outer periphery of said fixed section, to be engaged by the walls of a corresponding symmetrical series of inclined slots 6 formed in the inner edge of the mating separable section 7 for the purpose of securing the sections together and permitting the said separable section to be quickly attached and detached by a short rotary or rocking movement of the said separable section 7. The said slots 6, it will be seen, interrupt the continuity of the inner marginal edge of said separable section 7, and thus act as guides in placing the slots over the pins. The said fixed base section 4 is provided with the usual openings, such as 8, through which passes the valve stem.

To prevent creeping of the base section 4, the outer periphery of the same is provided with a pair of lugs or projections 10, between which an angular base 11 carried by the valve stem 9 is mounted. The said projections 10 also prevent the valve stem and tire lugs from turning. I have described but one pair of the lugs 10, but it is evident that numerous pairs of the same may be made use of.

The fixed base section 4 and the separable section 7 are in use, telescopically mounted one upon the other. In the present instance, as shown, I have mounted the separable section 7 upon the outer periphery of the said base section 4. The said base section 4 is provided with an inwardly extending recess 12, in which are a series of teeth or a toothed rack 13, and the said separable section 7 is provided with a corresponding series of teeth 14 at a point directly opposite said recess 12. A suitable key or tool 15 has a handle 16 at one end and a pinion 17 at its opposite end, said pinion being adapted to simultaneously engage the opposite teeth of the two racks during the operation of attaching or detaching said section 7. 18 indicates a locking plate which is provided near its upper edge with a series of inwardly projecting teeth 19, for engaging the teeth 14 of the said detachable section 7, and the ends of the said locking plate are provided with perforations 20, through which pass screws or bolts 21, to secure said plate in position upon the side of the felly 3. The shape of the outer marginal edges of the said base section 4 and detachable section 7 may be altered by a skilled mechanic to any common shape of rim margin now in use, such, for instance, as that which is known as "clencher," and then the usual clencher tire casing 22 may be located upon the base rim without the intervention of any sort of demountable rim, thus making use of only the separable rim portion of my invention. However, when, as herein shown, it is desired to place a demountable rim upon the base rim, the outer marginal edges of the said sections 4 and 7 are preferably in the form herein shown, and the demountable rim may be quickly placed in position upon and removed from the said base rim by the use of the teeth shown in detail in Fig. 6. Referring again to the base section, the said sections 4 and 7 are secured together and disconnected by means of a relatively rocking movement similar to that of an ordinary nut on a threaded bolt.

What I claim is the following:

The improved separable tire rim, comprising a fixed section in the form of a ring, a series of radial pins fixed upon the outer periphery of said section at the inner margin thereof, a separable section also in the form of a ring having in its inner marginal edge a series of inclined slots which interrupt said edge and act as placing-guides, said base section being provided with an inwardly extending recess, a toothed-rack in said recess, and a series of teeth on said separable section at a point directly opposite said recess.

In testimony whereof, I have signed my name to this specification, in presence of two subscribing witnesses.

WILLIAM M. WIRTH.

Witnesses:
E. L. WALLACE,
JOHN C. HIGDON.